July 8, 1930.    F. W. HERRING    1,770,308
SAND WASHING METER
Filed Dec. 14, 1929
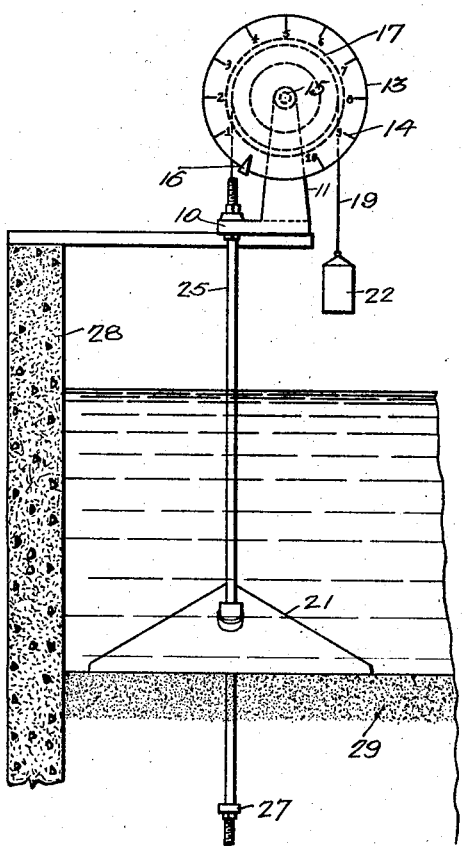
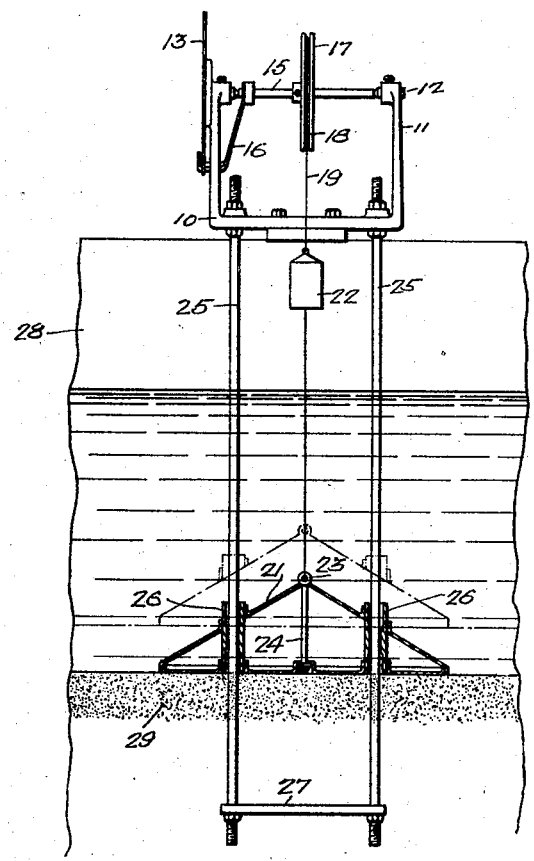
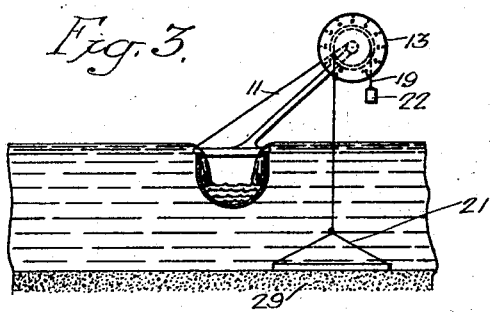
Inventor
Frank W. Herring
by his Attorneys
Howson & Howson Patented July 8, 1930

1,770,308

UNITED STATES PATENT OFFICE

FRANK W. HERRING, OF DETROIT, MICHIGAN

SAND-WASHING METER

Application filed December 14, 1929. Serial No. 414,139.

This invention relates to meters, and more particularly to a metering device for indicating the extent to which the sand of filter beds has been washed.

In washing a filter bed the sand, which during the filtering operation is in a firm strata and closely packed, is loosened so that the bed proper expands, the increase in thickness ordinarily being between 40 and 50 percent; that is to say, when the sand has been completely washed the depth of the bed will be from 40 to 50 percent greater than it is during the filtering operation. During the washing operation the water overlying the sand is extremely murky so that the depth of the sand bed cannot be readily observed. There is, for this reason, no convenient way of securing an accurate determination of the thickness of the sand bed during the washing operation, with the result that such operations are carried on by guess work or are gauged by the use of crude expedients to determine the time when the washing should be discontinued.

An important object of this invention is the provision of a simple and accurate gauging means for determining the extent of expansion of the filter bed and for providing an accurate reading showing the extent of such expansion at all times during the washing operation.

These and other objects I attain by the construction shown in the accompanying drawings wherein, for the purpose of illustration I have shown a preferred embodiment of my invention and wherein:

Fig. 1 is a sectional view through a filter illustrating metering apparatus constructed in accordance with my invention in end elevation;

Fig. 2 is a similar view partially in section and partially in side elevation, the float of the metering apparatus being indicated in dotted lines in the position which it assumes as the sand is washed; and Fig. 3 is a view similar to Fig. 1 illustrating an alternative form of mounting for the meter.

Referring now more particularly to the drawings, the numeral 10 generally designates a base having spaced standards 11 arising therefrom. The upper ends of these standards have each adjustably mounted therein a spurred pivot 12, and one of these standards having secured thereto a disc 13 the face of which is graduated as indicated at 14. Supported by the spurred pivots is a shaft 15 having rotatably adjustably secured thereto a pointer 16 for co-action with the dial produced by disc 13 and its graduations. Secured upon the shaft at the approximate center thereof is a sheave 17 having a grooved periphery 18 over which is passed a cable 19. The ends of the cable 19 are extended through openings 20 formed in the base 10 and has secured thereto at one end thereof a float 21 and at the opposite end thereof a counterweight 22.

Float 21 is at present illustrated as, and its preferred form comprises, a hollow conical body at the apex of which an attaching eye 23 is provided which preferably comprises the upper end of a bolt 24 extending vertically through the structure. Float 21 and weight 22 are so constructed and proportioned that the float will submerge in water but will float upon the surface of the sand when expanded during the washing action. If desired, guides 25 may be extended downwardly from the base 10 and through sleeves 26 incorporated in the structure of the float; where such guides are provided the lower ends of the guides should be connected by a transverse bar 27 positively limiting downward movement of the float, and the sleeves 26 should be of such diameter that operation of the sleeves over the guides will not be interfered with through collection of sand within the sleeve and about the bar.

Such a gauge may be supported either from the wall 28 of the filter tank or from the wash trough 29 of washing apparatus disposed within the tank or any other suitable support. After installation and when the filter bed 29 is in filtering condition, either the pointer or dial is adjusted to co-ordinate the pointer with the zero graduation of the dial. As the washing of the sand progresses, the float will rise with the expansion of the sand and the pointer will provide a continuous indication of the progress of the washing operation so that the washing may be discontinued just as soon as the expansion has progressed to the necessary extent. This will avoid loss of water which would attend over-washing and further eliminates the necessity for close attendance in the washing operation.

As the construction employed is obviously capable of a certain range of change and modification without materially departing from the spirit of my invention, I do not wish to be understood as limiting myself thereto except as hereinafter claimed.

I claim:

1. In combination with a filter tank, a bed arranged therein and of a character such that it expands when washed, means for washing said filter bed, a support, a rotatable shaft carried thereby, means for rotating the shaft including a float having a greater density than the fluid to be filtered and less density than the material of the filter bed when expanded, an index and a pointer operated by the shaft and co-acting with said index.

2. In a combination with a filter tank, a bed arranged therein and of a character such that it expands when washed, means for washing said bed, a float having a density greater than that of the fluid to be filtered and less than that of the bed when expanded, the float resting upon the bed, a relative movable index and pointer for co-action therewith and means operated by movement of the float for causing relative movement of the index and pointer.

3. In combination, a filter bed of such a character that it expands upon washing, washing means for said filter bed, a movable float member adapted to rest on the surface of said bed and having a density less than that of the bed and greater than that of the liquid to be filtered, and an indicating means connected to said float member adapted to indicate the expansion of said filter bed during washing.

4. In combination, a filter bed of such a character that it expands upon washing, washing means for said filter bed, a movable float member adapted to rest on the surface of said bed and having a density less than that of the bed and greater than that of the liquid to be filtered, an indicating means connected to said float member adapted to indicate the expansion of said filter bed during washing, and guiding means for said float member.

FRANK W. HERRING.